(12) United States Patent
Gardner et al.

(10) Patent No.: US 9,592,557 B2
(45) Date of Patent: Mar. 14, 2017

(54) CHUCK GUARD FOR LATHE

(71) Applicants: Martin Gardner, Franklin, TN (US);
Charles Weber, Onalaska, WI (US);
Benjamin Carlson, Holmen, WI (US)

(72) Inventors: Martin Gardner, Franklin, TN (US);
Charles Weber, Onalaska, WI (US);
Benjamin Carlson, Holmen, WI (US)

(73) Assignee: JPW Industries Inc., La Vergne, TN (US)

( * ) Notice: Subject to any disclaimer, the term of this patent is extended or adjusted under 35 U.S.C. 154(b) by 0 days.

(21) Appl. No.: 14/959,815

(22) Filed: Dec. 4, 2015

(65) Prior Publication Data

US 2016/0158846 A1 Jun. 9, 2016

Related U.S. Application Data

(60) Provisional application No. 62/088,835, filed on Dec. 8, 2014.

(51) Int. Cl.
*B23B 25/00* (2006.01)
*B23B 25/04* (2006.01)

(52) U.S. Cl.
CPC ........ *B23B 25/04* (2013.01); *B23B 2260/122* (2013.01)

(58) Field of Classification Search
CPC ... B23B 25/04; B23B 31/001; B23B 2231/28; B23B 2260/058
See application file for complete search history.

(56) References Cited

U.S. PATENT DOCUMENTS

| 3,811,340 | A | * | 5/1974 | Morse | F16P 1/02 144/48.3 |
|---|---|---|---|---|---|
| D248,954 | S | * | 8/1978 | Der-Avanessian | D15/126 |
| D265,204 | S | * | 6/1982 | Turchan | D15/130 |
| D265,319 | S | * | 7/1982 | Watanabe | D15/130 |
| 4,458,566 | A | * | 7/1984 | Tajima | B23Q 7/04 414/4 |
| 4,543,021 | A | * | 9/1985 | Adler | B23Q 11/08 144/251.1 |
| 5,008,828 | A | * | 4/1991 | Pinard | G05B 19/40932 700/160 |
| D320,607 | S | * | 10/1991 | Smith | D15/126 |
| D386,504 | S | * | 11/1997 | Dieck | D15/124 |

(Continued)

FOREIGN PATENT DOCUMENTS

| DE | 9106923.8 U1 | 7/1991 |
|---|---|---|
| DE | 4402272 A1 | 8/1995 |

(Continued)

OTHER PUBLICATIONS

Extended European search report—Apr. 18, 2016.

*Primary Examiner* — Will Fridie, Jr.
(74) *Attorney, Agent, or Firm* — Schiff Hardin LLP (57) ABSTRACT

A lathe or other rotating machine includes a chuck for holding a work piece or tool. The chuck is operated between grasping and releasing positions. A chuck guard is mounted on a housing of the rotating machine. The chuck guard has a transparent window and is mounted for pivoting movement between a position covering the chuck and a position exposing the chuck. A chuck guard extension with a window is attached at a front lower end of the chuck guard.

23 Claims, 9 Drawing Sheets

(56) References Cited

U.S. PATENT DOCUMENTS

| | | | | |
|---|---|---|---|---|
| 6,079,302 | A | * | 6/2000 | Gudleske ................ B23B 5/167 |
| | | | | 142/37 |
| 6,796,206 | B2 | * | 9/2004 | Li ...................... B23Q 11/0891 |
| | | | | 82/117 |
| D727,379 | S | * | 4/2015 | Mueller ........................ D15/122 |
| D748,697 | S | * | 2/2016 | Hynek ......................... D15/130 |
| D749,655 | S | * | 2/2016 | Keckstein .................... D15/130 |

FOREIGN PATENT DOCUMENTS

| | | |
|---|---|---|
| DE | 102012217666 A1 | 3/2014 |
| FR | 2161270 A5 | 7/1973 |
| FR | 1366188 | 9/1974 |
| JP | 2003231039 A | 8/2003 |
| WO | 8102130 A1 | 8/1981 |

* cited by examiner

CHUCK GUARD FOR LATHE

RELATED APPLICATION

The present application claims the benefit of the filing date of provisional application 62/088,835, filed Dec. 8, 2014 titled "CHUCK GUARD AND NON-SLIP MAT FOR LATHE", inventors Gardner et al.

BACKGROUND

Field

The present invention relates generally to a lathe or other rotating machine, and more particularly to a chuck guard for a lathe or other rotating machine.

Description of the Related Art

A lathe holds a work piece from one or both ends as the work piece is rotated at relatively high speed. Tools such as cutting and shaping tools are moved into contact with the rotating work piece to shape the work piece. A lathe is commonly used to form spindles, table legs, chair legs, crank shafts, and other rotationally formed portions, which are held from both ends. A lathe may also be used to form bowls or the like by mounting the work piece so that it is held at a single end.

Lathes may be used to shape wood, metal, or other materials. The work piece materials are supported by a chuck that is connected to a motor which operates to rotate the chuck and the work piece, typically at high speed. The work piece is engaged in the chuck by adjusting the chuck to engage the work piece so that the work piece may be shaped, and the work piece is released from the chuck by adjusting the chuck so that the shaped work piece may be removed from the lathe. The chuck typically includes grasping elements that move toward and away from one another symmetrically about the rotational center of the chuck. The grasping elements may be moved using a tool referred to as a chuck key. The chuck key is inserted into a key receiving opening on the chuck and is rotated to operate gear mechanisms within the chuck that move the grasping elements.

In addition to lathes, drills, drill presses, routers, cutting, sanding and shaping tools, powered screw drivers and wrenches and other tools may have chucks. In drills, drill presses, and the like, the chuck is operable to hold a tool, such as a drill bit.

SUMMARY OF THE INVENTION

Certain embodiments of the present invention provide a guard mounted on a housing of the lathe or other rotating machine. The guard extends over and partially surrounds the chuck of the lathe. The guard of certain embodiments extends from the housing as far as the chuck or at least nearly so. The guard of certain embodiments extends about three sides of the chuck. A chuck guard extension with a window is attached at a front lower end of the chuck guard.

DETAILED DESCRIPTION OF THE PREFERRED EMBODIMENTS

Figure 1:
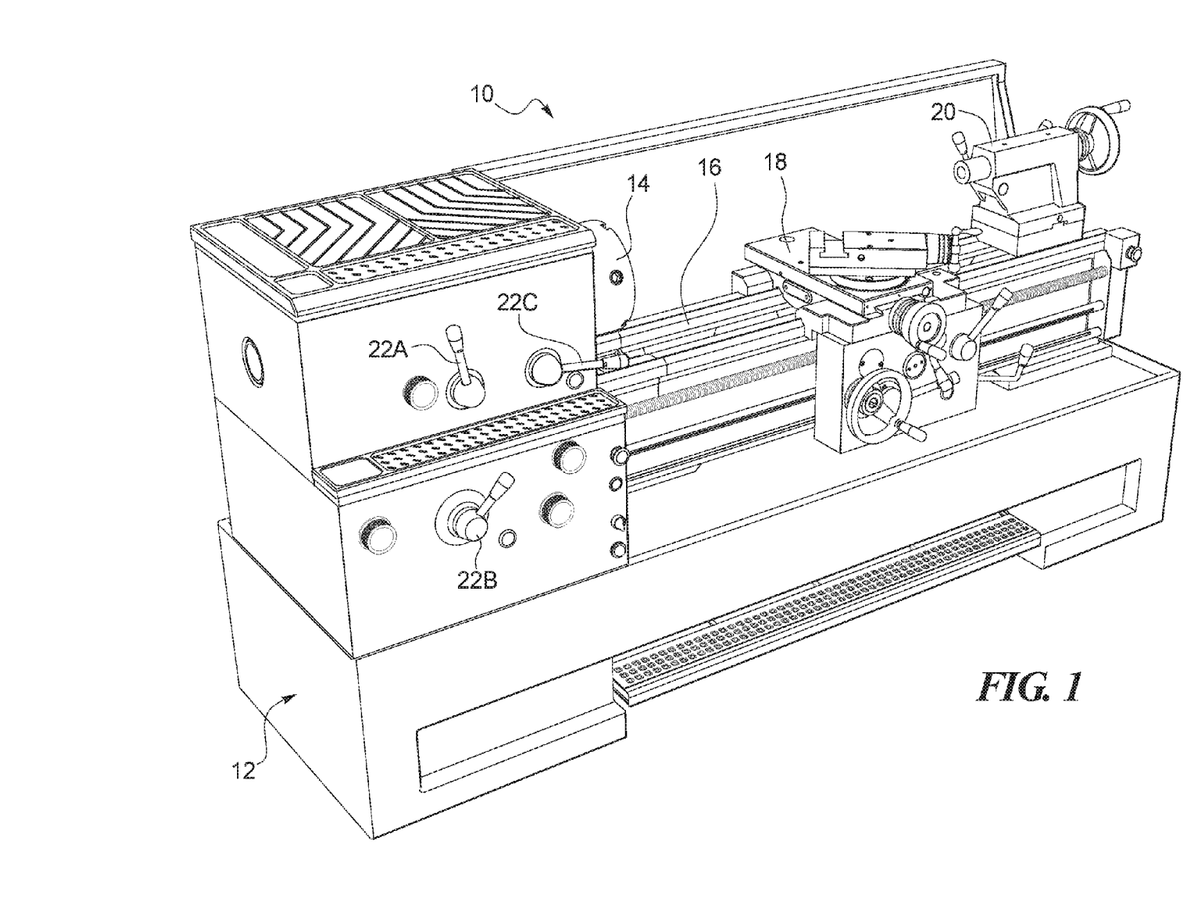
FIG. 1 is a perspective view of a lathe of a type that may include a chuck guard, although other lathes may include a chuck guard as well.

In FIG. 1, a lathe 10 includes a housing 12 within which is mounted a motor (not shown) that drives a chuck or headstock 14 that holds a work piece. The lathe 10 includes a bed 16 on which is mounted a carriage 18 and at the end of which is mounted a tailstock 20. Controls such as 22A, 22B, 22C for the operation of the lathe 10 are provided on the housing 12.

Figure 2:
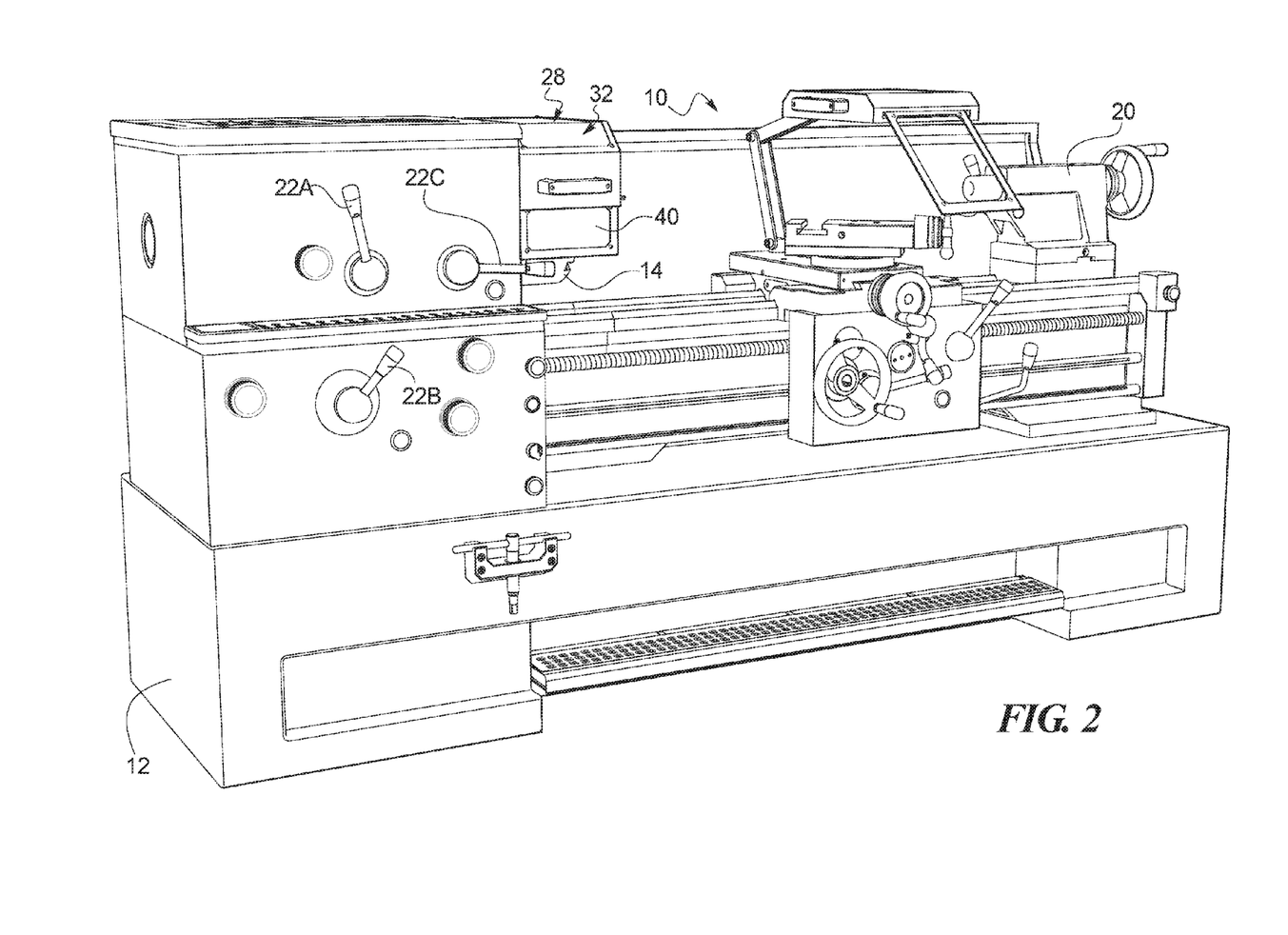
FIG. 2 is a perspective view of a lathe similar to the lathe shown in FIG. 1 and including a chuck guard with a chuck guard lower viewing window.

Turning to FIG. 2, the lathe 10 includes a chuck guard 28 extending over and partially around the chuck 14 and having a top viewing window 32 and a lower front viewing window 40. Any material ejected from the chuck is blocked by the chuck guard 28. The chuck guard 28 is preferably shaped to block ejected material from the user and may include top transparent window 32 with window segments 32A, 32B, 32C as shown in FIG. 3 and with a removable lower front viewing window 40 also shown in FIG. 4 and described hereafter.

Figure 3:
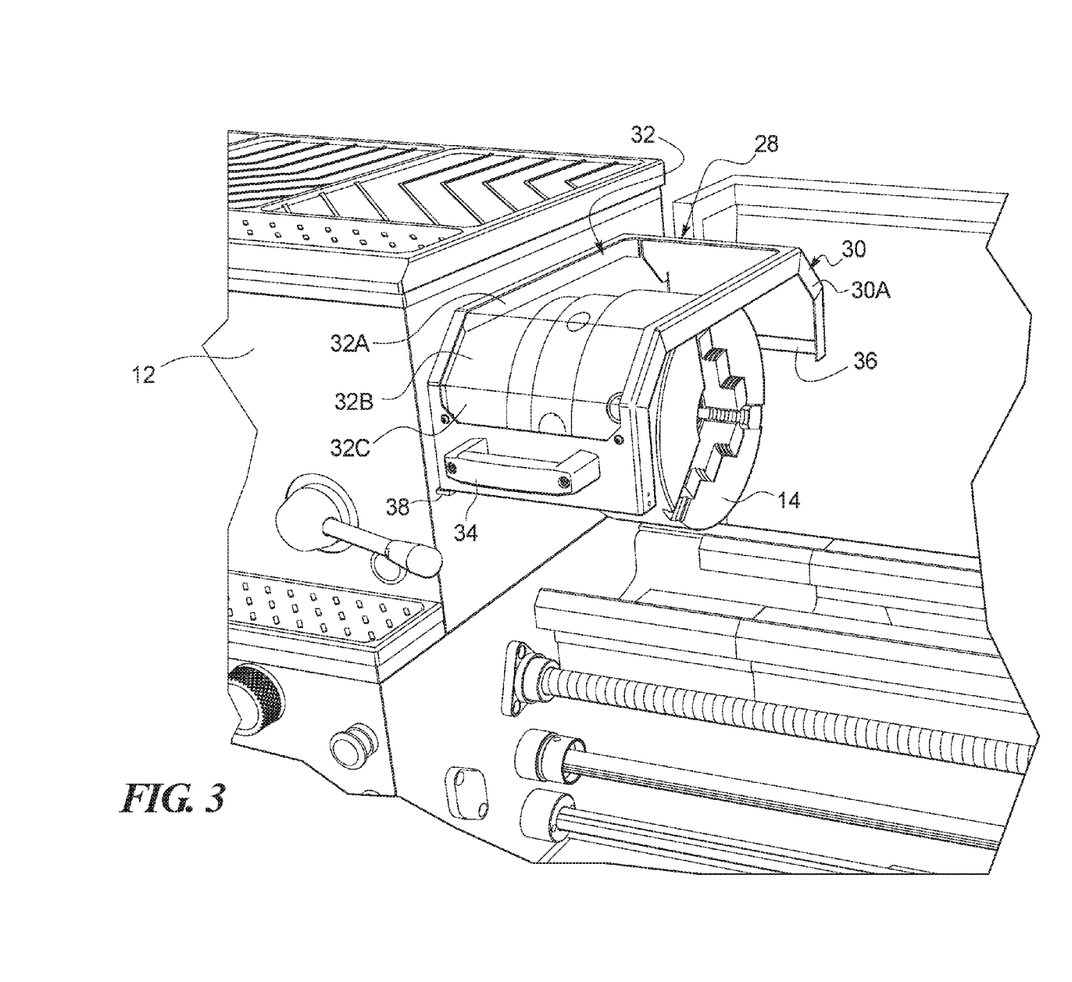
FIG. 3 is a perspective view of the chuck of the lathe provided with the chuck guard but with a chuck guard extension containing a lower viewing window folded back, slid up, or removed.

With reference to FIG. 3, the chuck guard 28 includes a frame 30 mounted to the housing 12 by use of a pivot mount assembly 36 extending from the housing and is shaped to a generally C-shaped configuration. The illustrated chuck guard 28 includes five generally planar portions joined together to form the C-shape. The guard 28 extends over the top of the chuck 14 and partially over the front and back of the chuck 14. Certain embodiments of the chuck guard 28 extend from the housing 12 a greater distance than the chuck 14. The frame 30 includes a downwardly directed edge 38A.

In certain embodiments, the chuck guard 28 includes the transparent top window 30 with segments 32A, 32B, 32C through with the user may view the chuck 14 as it is a benefit to the user to have visibility to the chuck and workpiece while the guard 28 is in its lowered position. The window 32 of the illustrated embodiment extends along one of the five planes as segment 32A and partially along two further planes as segments 32B and 32C. The transparent window 32 may be of glass, shatterproof glass, plastic or other material. The window 32 of certain embodiments is scratchproof. Any known material may be provided as the top window 32 or lower front window 40.

In the illustrated embodiment, the chuck guard 28 has a handle 34 mounted extending from the front thereof. The chuck guard 28 may be mounted to pivot to a position out of the way of the chuck 14, such as by grasping the handle 34 and lifting. For example, the pivot mount assembly 36 which may be a shaft with a coaxial tube surrounding the shaft may be provided at the back of the chuck guard 28 where it attaches to the housing 12. The chuck guard 28 may be pivoted to access the chuck 14 and pivoted back into the position shown prior to use of the lathe 10. The chuck guard 28 may have a stop 38 on the housing 12 to hold the chuck guard 28 in the illustrated position.

The chuck guard may be formed of metal or may be provided with the transparent window 32 in the frame 30 of metal, or may be of any material. Other shapes and configurations are of course possible.

Figures 4, 5:
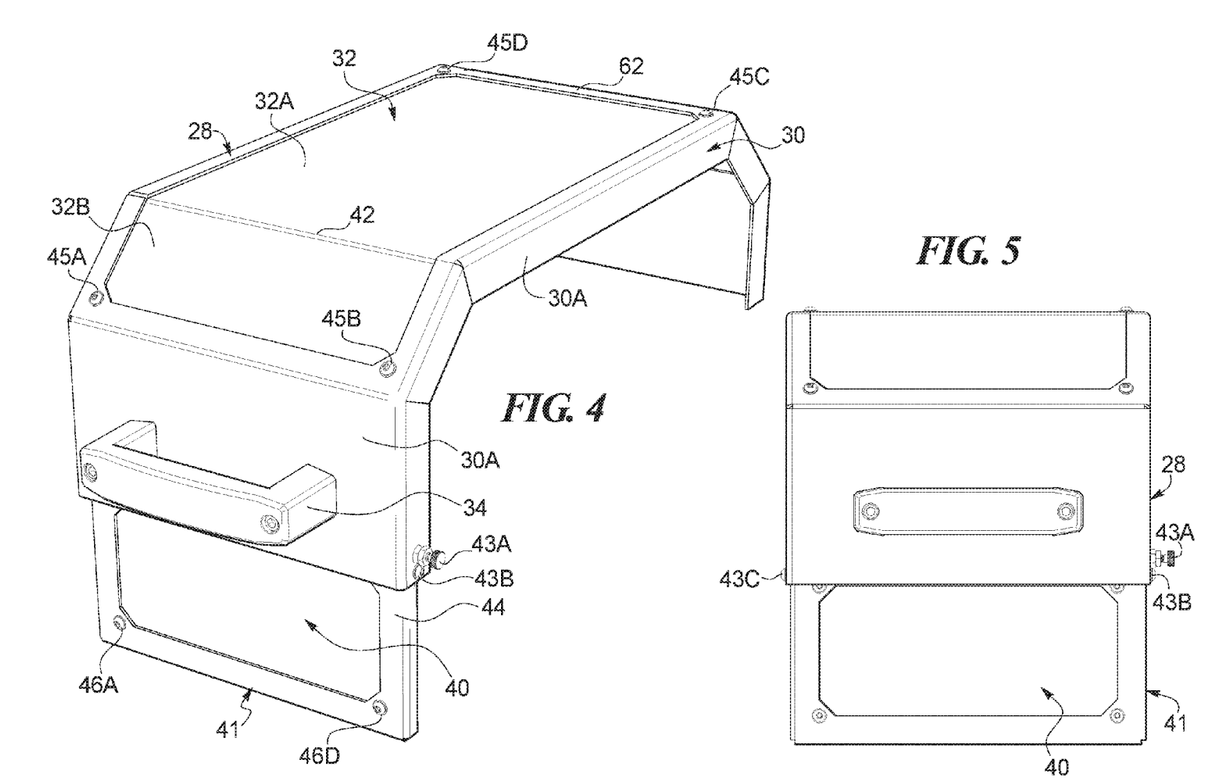
FIG. 4 is a perspective view showing only the chuck guard with the lower extension.
FIG. 5 is a front view of the chuck guard shown in FIG. 4.

In the perspective view of FIG. 4, an alternate embodiment of the chuck guard 28 is illustrated separate from the lathe. The chuck guard 28 in FIG. 4 differs somewhat from the chuck guard 28 shown in FIG. 3 since the top window 32 has only two segments 32A and 32B without the third segment 32C shown in FIG. 3. As may be further observed in FIG. 4, a support bar 42 is illustrated with the window 32 wrapping around from segment 32A into the segment 32B at the support bar 42.

Also in FIG. 4 is shown in greater detail the frame 30 has a removable top frame section 62 overlying a top of a frame section 30A of the frame 30 such that the transparent window 32 is sandwiched between the two frame sections. The top frame section 62 is held in place by four screws 45A, 45B, 45C, and 45D. Alternatively the window 32 may be bolted directly to the top of the frame section 30A.

In FIG. 4 and in FIG. 5 one may also observe the foldable chuck guard extension 41 with lower front window 40 as a lower frame attached to the frame 30 by pivot points 43B and 43C which may be pivot pins. Thus the lower frame as the extension 41 having the additional transparent lower front window 40 is foldable. It may also be removable or could be slidable on a track and held in position by a locking mechanism 43A which could be a thumb screw, a spring loaded lock pin, or other selectably locked locking mechanism to prevent free movement of extension 41.

One may further observe that in the embodiment of FIG. 4 the additional window segment 32C shown in FIG. 3 is not provided.

Figures 6, 7, 8:
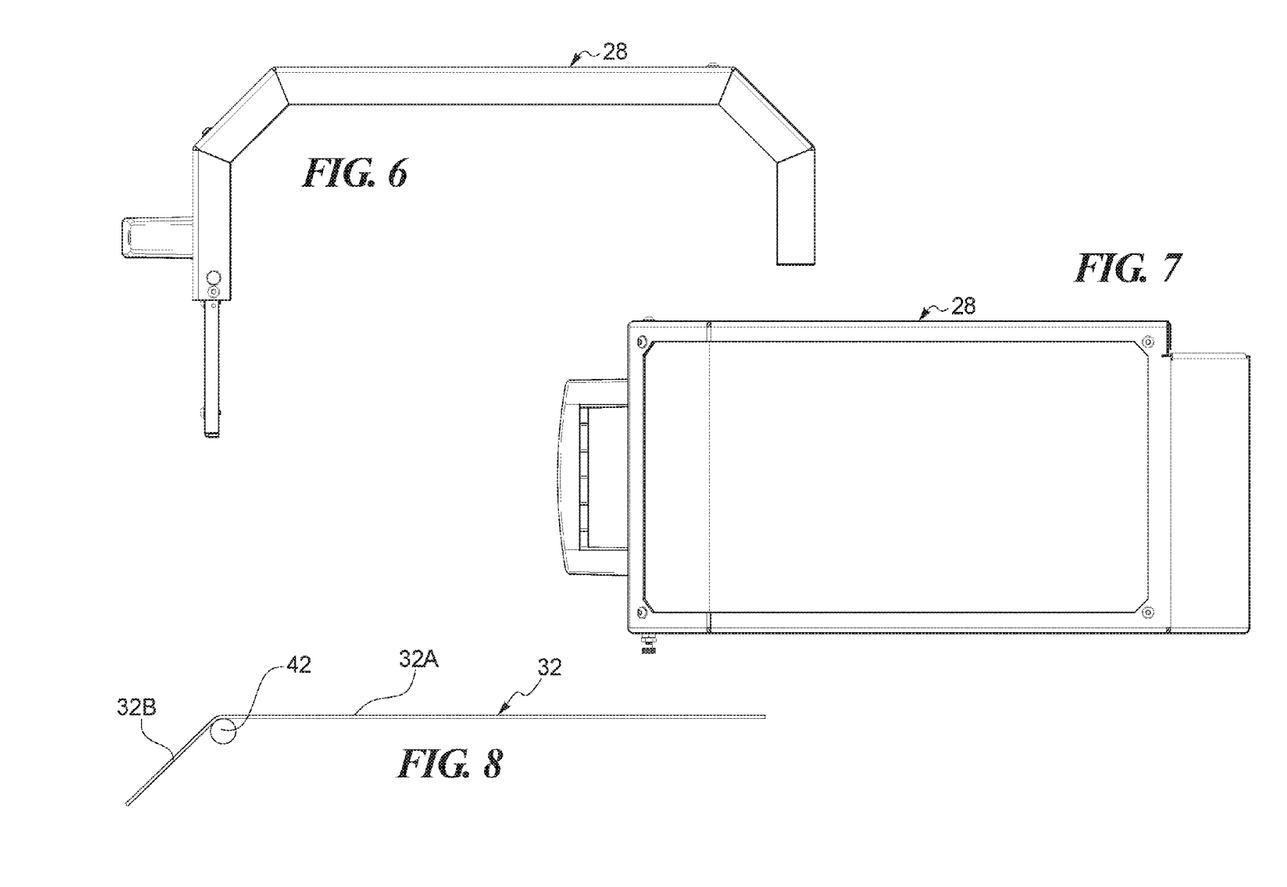
FIG. 6 is a side view of the chuck guard shown in FIG. 4.
FIG. 7 is a top view of the chuck guard shown in FIG. 4.
FIG. 8 is a side view of a viewing window and support bar only removed from the chuck guard of FIG. 4.

FIGS. 5, 6, and 7 show front, side, and top views of the chuck guard 28 of FIG. 4.

FIG. 8 shows the top window 32 with the segments 32A and 32B integrally connected and which wrap around the support rod 42 in a side view removed from the frame 30.

Figure 9:
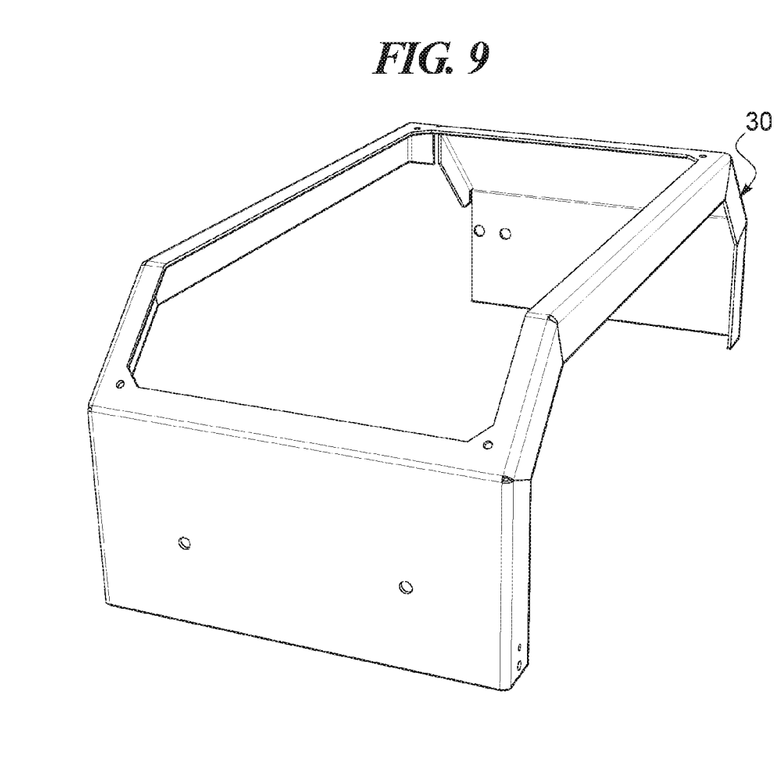
FIG. 9 is a perspective view of the chuck guard extension removed from the chuck guard in FIG. 4 and also having the viewing window removed therefrom.

FIG. 9 shows a perspective view of the frame 30 but with the handle 34, lower extension 41 with lower window 40, and top window 32 removed along with the top frame section 42.

Figure 10:
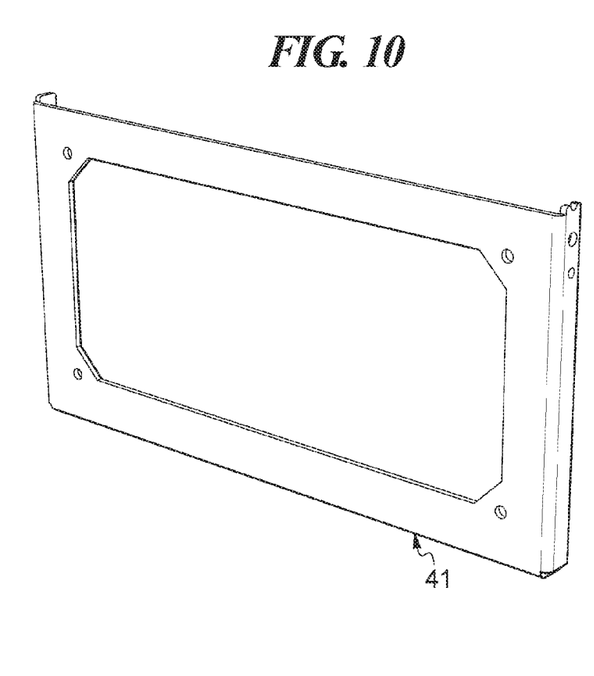
FIG. 10 is a perspective view of the chuck guard extension removed from the chuck guard.

FIG. 10 shows in perspective the chuck guard extension 41 lower frame without the window 40 and also removed from the frame 30. By comparing FIG. 10 with FIG. 4 one may observe that the lower frame of the extension 41 has an outer frame section 44 held to an outer surface of the lower frame of extension 41 by respective screws 46A, 46B, 46C, and 46D (see also FIG. 13) with the window 40 sandwiched therebetween. This outer frame section 44 is removed in the FIG. 10 view. Alternatively the window 40 may be directly secured to the lower frame of the extension 41 with bolts.

Figure 11:
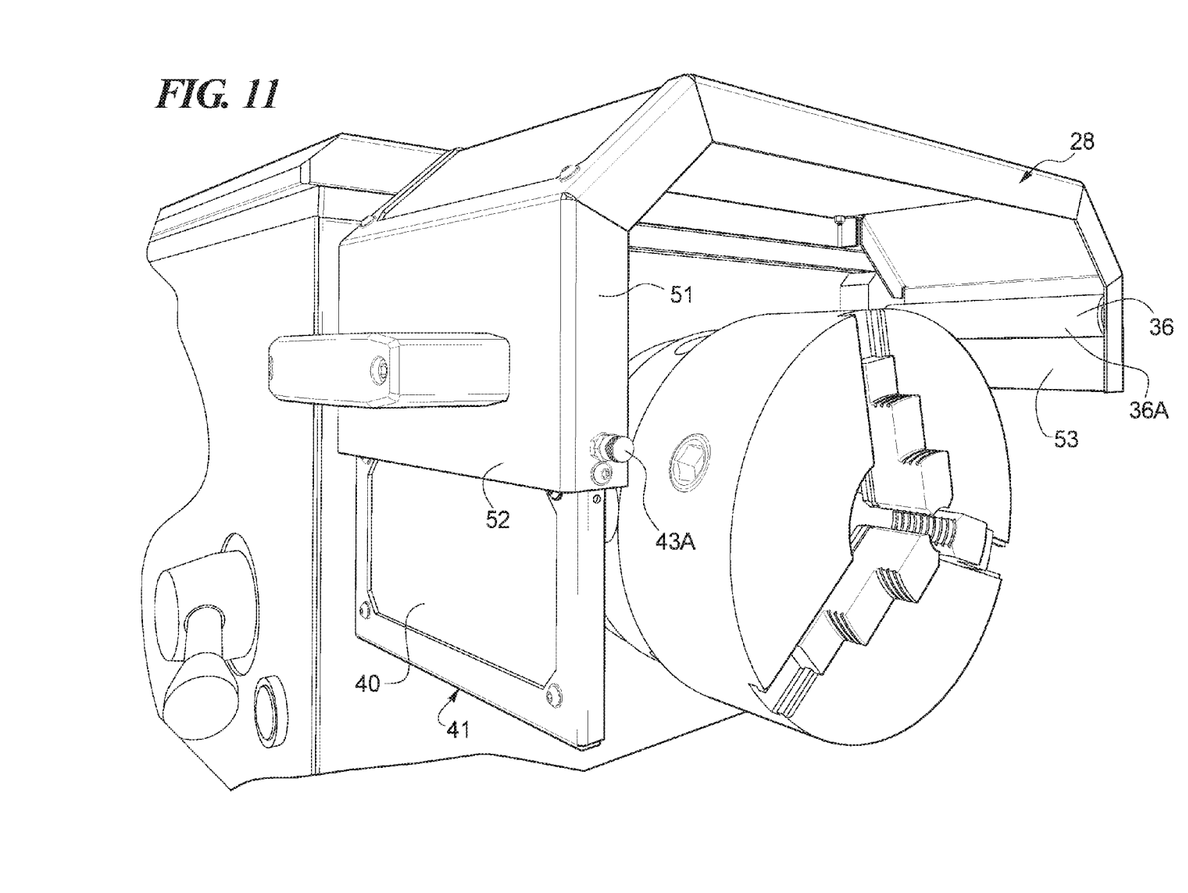
FIG. 11 is a perspective view from the front and the right of the chuck of the lathe provided with the chuck guard.
Figure 12:
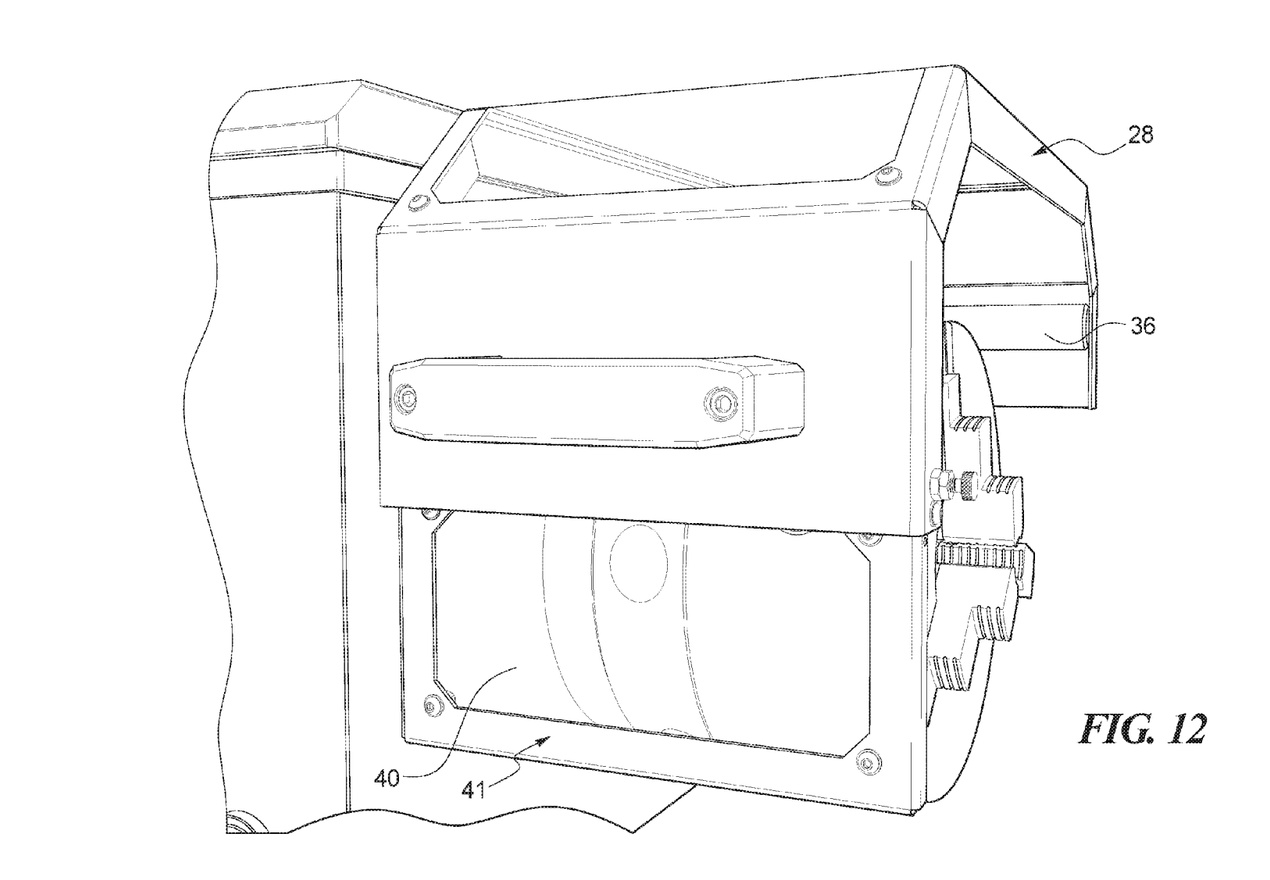
FIG. 12 is another perspective view primarily from the front of the chuck of the lathe provided with the chuck guard.
Figure 13:
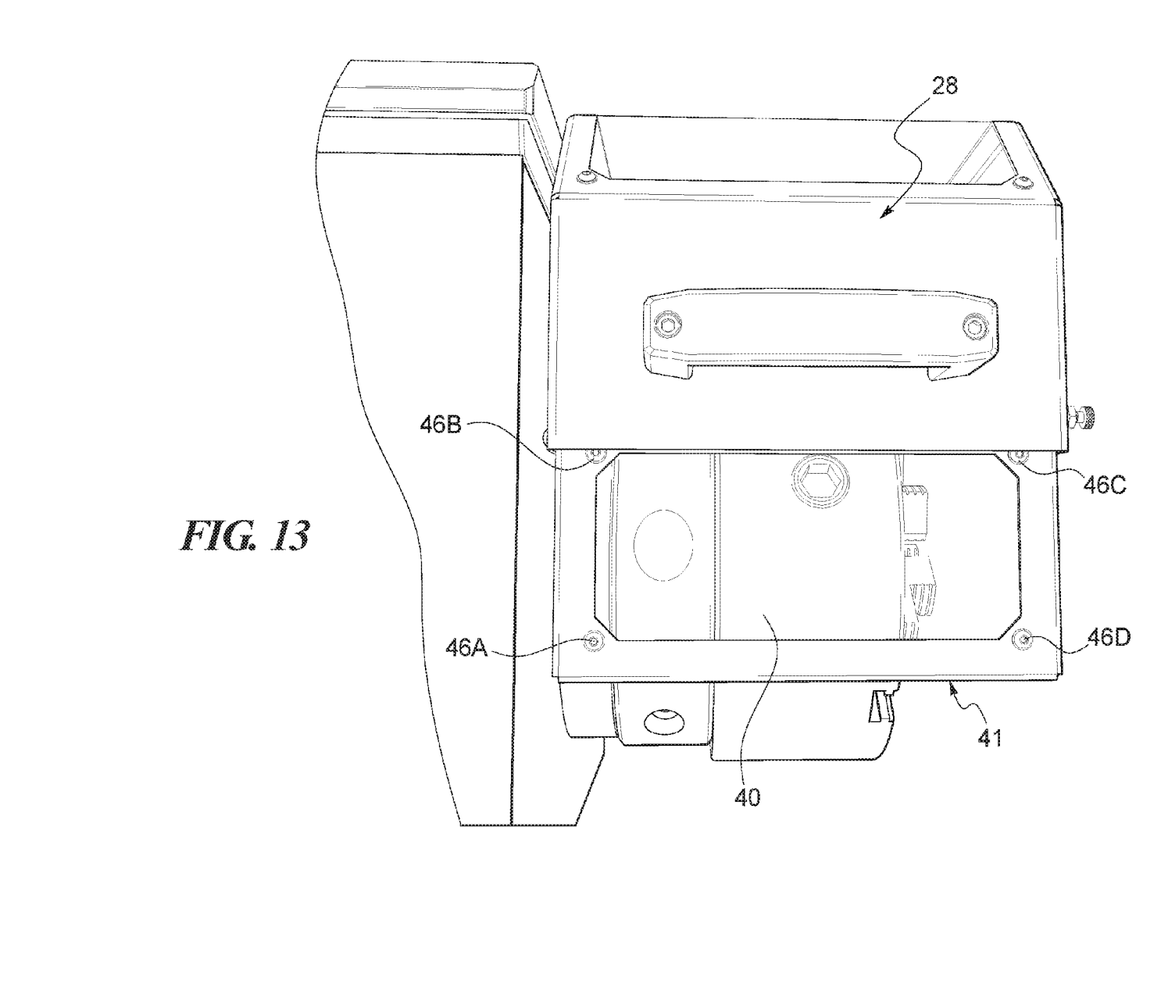
FIG. 13 is a front view of the chuck of the lathe provided with the chuck guard.

FIGS. 11, 12, and 13 are respectively a perspective view from the front and right, a perspective view from primarily the front, and an end view of the chuck guard 28 with the extension 41 with the respective window 40 attached and deployed. Also in FIGS. 11 and 12 one may observe the pivot mount 36 in greater detail discussed previously.

As previously described, instead of removing the lower frame functioning as the extension 41 for protective viewing through the respective transparent window 40, this lower frame as an extension may be folded up against the back of a vertical front portion of the frame 30. This folded up position may be desirable with the carriage and tool rest moved all the way toward the head stock where there would be interference if the extension was not folded up and thus rotated up out of the way.

For such folding of the extension 41 the pivot points 43B and 43C are provided for the folding. As previously described the extension 41 may also be slid up behind the front portion of the guard.

Thus with the preferred embodiment the vertical front facing part of the chuck guard may be foldable. When the lower frame extension is folded up, it allows the carriage assembly to slide all the way to the chuck to machine the workpiece close to the chuck without interfering with the guard and also without removing the guard.

As previously mentioned, the windows may be safety glass.

In an alternate embodiment instead of folding the extension as described above it is also possible to provide a track at inner sides of folded over edges 51 of frame 41 at front portion 52 as shown in FIG. 11. With this construction the extension 41 can be slid up and down vertically parallel to the back side of the front portion 52 of the frame 30. Then a thumb screw such as 43A can be tightened down to lock the slid up or slid down extension in place.

With respect to the previously described pivot mechanism 36, this may have various constructions. In one preferred construction an outer cylinder 36A as shown in FIG. 11 may be attached such as by welding to a back portion 53 of the guard 28. A shaft attached to the frame is then received within the cylinder 36A so that the outer cylinder pivots around the shaft, thus allowing pivoting of the overall chuck guard as previously described.

Furthermore, since access to the chuck 14 at peripheral locations is sometimes necessary the folding up of the chuck guard is particularly convenient to allow access to the peripheral portions of the chuck for tightening or securing a workpiece followed by a subsequent lowering again of the chuck guard.

The primary drawbacks of current chuck guards is that they limit the users visibility to the chuck and the location of the workpiece being secured by the chuck. Additionally, they are limited in ability to provide coverage as they must reserve room for carriage to travel up to the face of the chuck. The exemplary embodiment provides greater protection by providing increased coverage during normal operation.

Thus there is shown and described a chuck guard partially around a chuck of a metal lathe, wood lathe, drill press, drill, router, or other machine. The chuck guard may be pivotable away from the chuck or back to a position at the chuck.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A rotating machine, comprising:
    a housing;
    a motor that is operable for rotational motion;

a chuck connected for rotation by the motor, the chuck including grasping elements that are movable relative to a rotational center of the chuck;

a chuck guard mounted on the housing and extending at least partially over the chuck; and a chuck guard extension with a window attached at a front lower end of the chuck guard extending below a front portion of the chuck guard, the chuck guard extension being pivotable around a pivot point allowing folding of the extension against a back side of a front portion of a frame of the chuck guard.

2. The rotating machine as claimed in claim 1, wherein the chuck guard is mounted for pivoting movement between a first position at least partially covering the chuck and a second position exposing the chuck, the chuck guard providing access to the workpiece held in the chuck while in the first position.

3. The rotating machine as claimed in claim 2, further comprising:

a handle mounted on the chuck guard for engagement by a user to move the chuck guard between the first position and the second position.

4. The rotating machine as claimed in claim 1, further comprising: a transparent window mounted in the chuck guard.

5. The rotating machine as claimed in claim 1, further comprising:

a pivot assembly at a back end of the chuck guard, the pivot assembly being constructed to allow a front end of the chuck guard to be moved upwardly away from the chuck.

6. The rotating machine as claimed in claim 1, further comprising:

a top transparent window with at least two angled segments in the top portion of the chuck guard.

7. The rotating machine as claimed in claim 1, wherein the chuck guard extension with the window is constructed to be selectively removable from the chuck guard.

8. A rotating machine, comprising:

a housing;

a motor that is operable for rotational motion;

a chuck connected for rotation by the motor, the chuck including grasping elements that are movable relative to a rotational center of the chuck;

a chuck guard mounted on the housing and extending at least partially over the chuck;

a chuck guard extension with a window attached at a front lower end of the chuck guard extending below a front portion of the chuck guard; and a track mechanism allowing sliding of the extension upwardly or downwardly in a path parallel to a back surface of a front portion of a frame of the chuck guard.

9. The rotating machine as claimed in claim 1, wherein the extension comprises a lower frame with an additional frame section and wherein said window of the extension is sandwiched between the frame section and the lower frame.

10. The rotating machine as claimed in claim 1, wherein the chuck guard comprises a frame member and a top frame section overlying the frame member, and further comprising: a transparent window mounted between the frame member and the top frame section.

11. A rotating machine, comprising:

a housing;

a motor that is operable for rotational motion;

a chuck connected for rotation by the motor, the chuck including grasping elements that are movable relative to a rotational center of the chuck;

a chuck guard mounted on the housing and extending at least partially over the chuck; and a chuck guard extension with a window attached at a front lower end of the chuck guard extending below a front portion of the chuck guard; and a locking mechanism operable to a locked position to prevent movement of the extension in the locked position.

12. A rotating machine, comprising:

a housing having a wall;

a motor mounted within the housing, the motor having an output and being operable for rotational motion;

a chuck connected to the output of the motor for rotation by the motor, the chuck extending from the wall of the housing, the chuck including grasping elements that are movable relative to a rotational center of the chuck;

a chuck guard mounted extending from the wall of the housing by at distance at least partially over the chuck, the chuck guard being of a size and shape to provide access to a workpiece held in the chuck while simultaneously extending over the chuck, the chuck guard including a transparent window; and a chuck guard extension selectively extending from a front lower end of the chuck guard below a front portion of the chuck guard, the chuck guard being selectively movable to a position behind the front portion of the chuck guard.

13. The rotating machine as claimed in claim 12, wherein the chuck guard extension includes an extension transparent window.

14. The rotating machine as claimed in claim 12, wherein the chuck guard extension is selectively movable to the position behind the front portion of the chuck guard by one of sliding or pivoting.

15. The rotating machine as claimed in claim 12, wherein the transparent window of the chuck guard includes first and second window portions mounted at an angle to one another.

16. The rotating machine as claimed in claim 8, wherein the chuck guard is mounted for pivoting movement between a first position at least partially covering the chuck and a second position exposing the chuck, the chuck guard providing access to the workpiece held in the chuck while in the first position.

17. The rotating machine as claimed in claim 16, further comprising:

a handle mounted on the chuck guard for engagement by a user to move the chuck guard between the first position and the second position.

18. The rotating machine as claimed in claim 8, further comprising: a transparent window mounted in the chuck guard.

19. The rotating machine as claimed in claim 8, further comprising:

a pivot assembly at a back end of the chuck guard, the pivot assembly being constructed to allow a front end of the chuck guard to be moved upwardly away from the chuck.

20. The rotating machine as claimed in claim 8, further comprising:

a top transparent window with at least two angled segments in the top portion of the chuck guard.

21. The rotating machine as claimed in claim 8, wherein the chuck guard extension with the window is constructed to be selectively removable from the chuck guard.

22. The rotating machine as claimed in claim 8, wherein the extension comprises a lower frame with an additional frame section and wherein said window of the extension is sandwiched between the frame section and the lower frame.

23. The rotating machine as claimed in claim 8, wherein the chuck guard comprises a frame member and a top frame section overlying the frame member, and further comprising: a transparent window mounted between the frame member and the top frame section.

* * * * *